United States Patent
Fisher

(10) Patent No.: US 6,485,251 B1
(45) Date of Patent: Nov. 26, 2002

(54) PIPE LIFTER

(76) Inventor: Paul Fisher, 1305 Maple, Ellis, KS (US) 67637

( * ) Notice: Subject to any disclaimer, the term of this patent is extended or adjusted under 35 U.S.C. 154(b) by 0 days.

(21) Appl. No.: 09/702,392

(22) Filed: Oct. 31, 2000

(51) Int. Cl.$^7$ .................................................. B66F 11/00
(52) U.S. Cl. ............................... 414/745.1; 414/745.9; 414/746.1; 198/728; 198/861.1
(58) Field of Search ............................ 414/745.1, 745.9, 414/746.1; 198/861.1, 728

(56) References Cited

U.S. PATENT DOCUMENTS

| | | |
|---|---|---|
| 303,384 A | 8/1884 | Bishop |
| 975,721 A | 11/1910 | Russell |
| 1,053,391 A | 2/1913 | Hilke |
| 1,352,262 A | 9/1920 | Harding |
| 2,416,050 A | 2/1947 | Franklin |
| 2,807,351 A | 9/1957 | Carlson |
| 2,870,900 A | 1/1959 | Will |
| 2,995,236 A | 8/1961 | Berger |
| 3,127,005 A | 3/1964 | Twyman |
| 3,477,559 A | 11/1969 | Raasch |
| 3,748,759 A | 7/1973 | Liess |
| 3,825,106 A | 7/1974 | Wickam et al. |
| 4,081,087 A | 3/1978 | Freeman, Sr. |
| 4,082,179 A | 4/1978 | Beyer |
| 4,099,630 A | 7/1978 | Beck |
| 4,491,450 A | 1/1985 | George |

Primary Examiner—Kathy Matecki
Assistant Examiner—Michael Lowe
(74) Attorney, Agent, or Firm—Chase Law Firm, L.C.

(57) ABSTRACT

A lift system particularly designed for transport of pipes from a first to a second elevated location includes first and second storage locations with a lifter component positioned therebetween. The lifter is positioned such that pipes at a first location can be easily picked off a first location by the lifter for transport to the second location. Fingers on the drive chains of the lifter offer a two-point spaced contact to each pipe whether picked off the location or placed thereon by the user. Upon each pipe reaching the upper end of the lifter the fingers return to the lower end which causes a deposit of the pipe onto a second elevated location, e.g., a storage location, truck bed or the like.

15 Claims, 3 Drawing Sheets

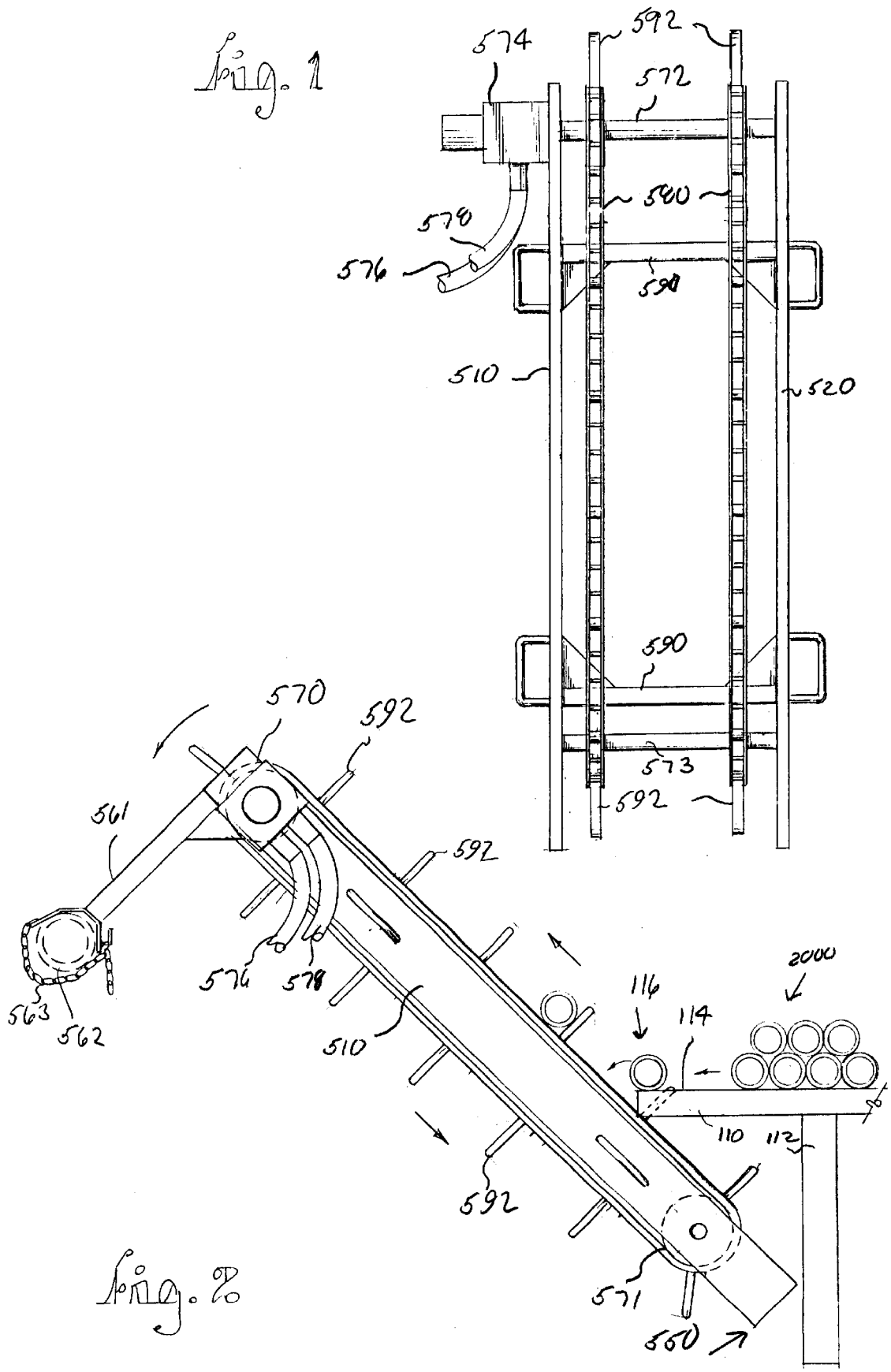

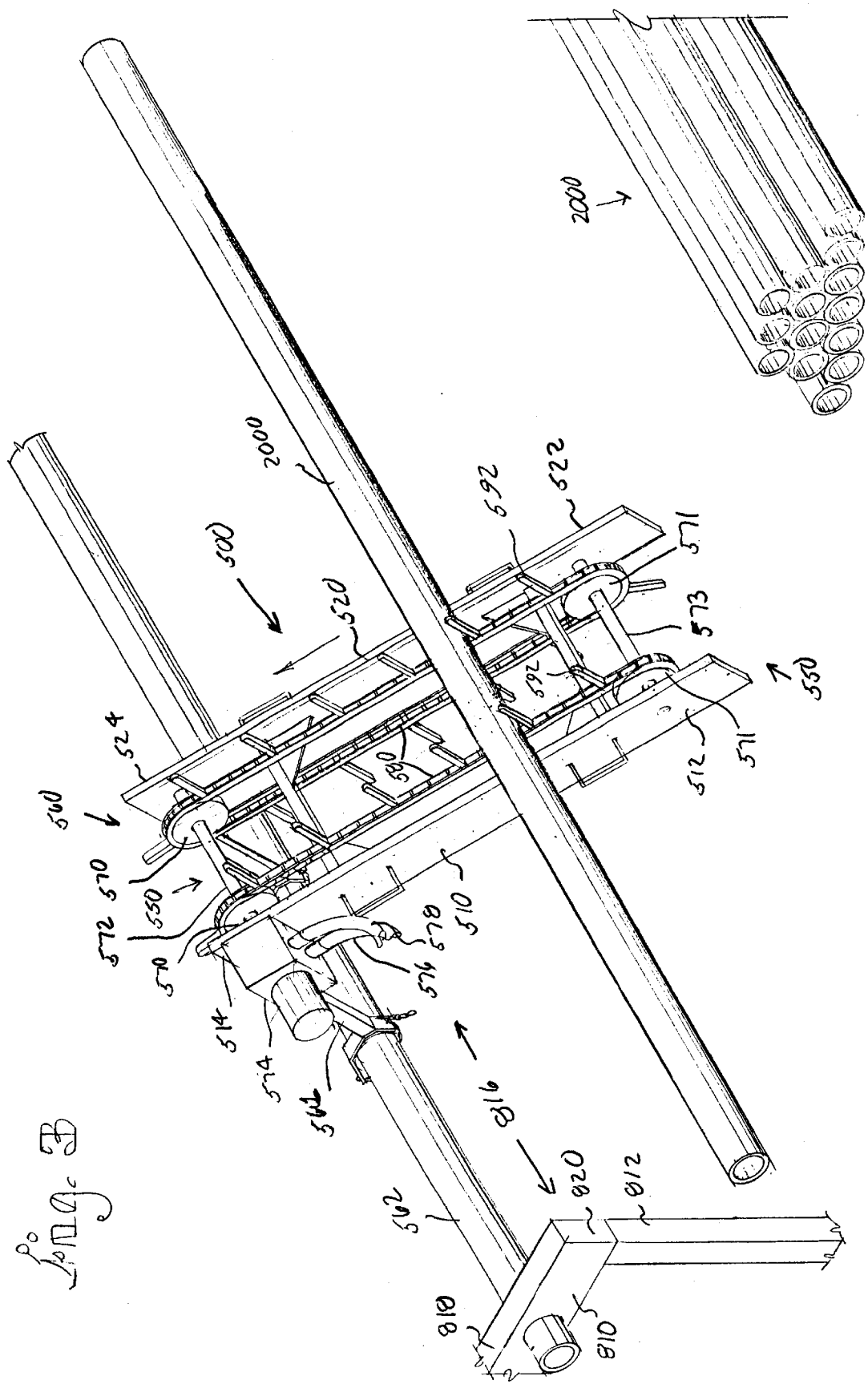

PIPE LIFTER

BACKGROUND OF THE INVENTION

This invention relates to a lifting device and, more particularly, to a system particularly designed for transporting well drilling pipes from one storage location to another second higher location or vice versa.

The use of a plurality of pipes in drilling wells is well known. In such an environment, well pipes are constantly being dismantled and stored at a field site for transport to another central storage rack or to a bed of a vehicle. Due to the elongated configuration of these pipes, the transfer of the pipes from one location to another can be awkward, tedious and fatiguing.

Although a number of elevating devices are known, no devices have been designed to particularly address the transfer of well pipes from one location to another. No devices have been shown which decrease the awkwardness, tediousness, and fatigue associated with such transfers.

In response thereto I have invented a pipe lifter which easily transports pipes between storage racks or from a first rack to the back of a transport truck or the like. A first storage rack presents first and second rails having an input end adjacent an input end of the lift. As such, the pipes are easily rolled along the rails of the storage rack for deposit onto the lift for elevation to a higher storage position, such as an upper storage rack or an end of a truck bed or the like. Upon the pipe approaching this elevated location it is deposited thereon. The design of the pipe lifter system enables the pipes to be easily transferred between these two locations and diminishes the awkwardness and fatigue associated therewith.

It is therefore a general object of this invention to provide a lifter system particularly designed for use with elongated pipes or the like.

Another object of this invention is to provide a first storage rack for the pipes or the like which is integrated into the downstream portion of the system.

A further object of this invention is to provide a pipe lifting system, as aforesaid, which elevates the pipes to a second storage location upstream of the first rack, such as a second storage rack, truck bed or the like.

Another object of the invention is to provide a system, as aforesaid, which includes a lifting device having an elongated end easily attached to an edge of the truck bed or the like.

Another particular object of this invention is to provide a system, as aforesaid, wherein the lifting device includes a pair of spaced-apart flanges thereon which picks a pipe at the output end of the first storage rack, elevates this pipe to the second end of the lifting device and deposits the pipe at the second storage location upon movement Of the flanges towards the first storage rack.

A further object of this invention is to provide a system, as aforesaid, which diminishes the awkwardness, tediousness and fatigue associated with the transport of well pipes from one storage location to another.

Another object of this invention is to provide a system, as aforesaid, which reduces the manpower needed to transfer a pipe from storage location to another.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 1 is a front view of the lift device component of the system;

FIG. 2 is a side view of the device of FIG. 1 and additionally showing an end view of the bar for attachment to a second storage rack, truck bed or the like;

FIG. 3 is a perspective view of the system and showing a portion of an elevated second storage rack;

DESCRIPTION OF THE PREFERRED EMBODIMENT

Figure 4:
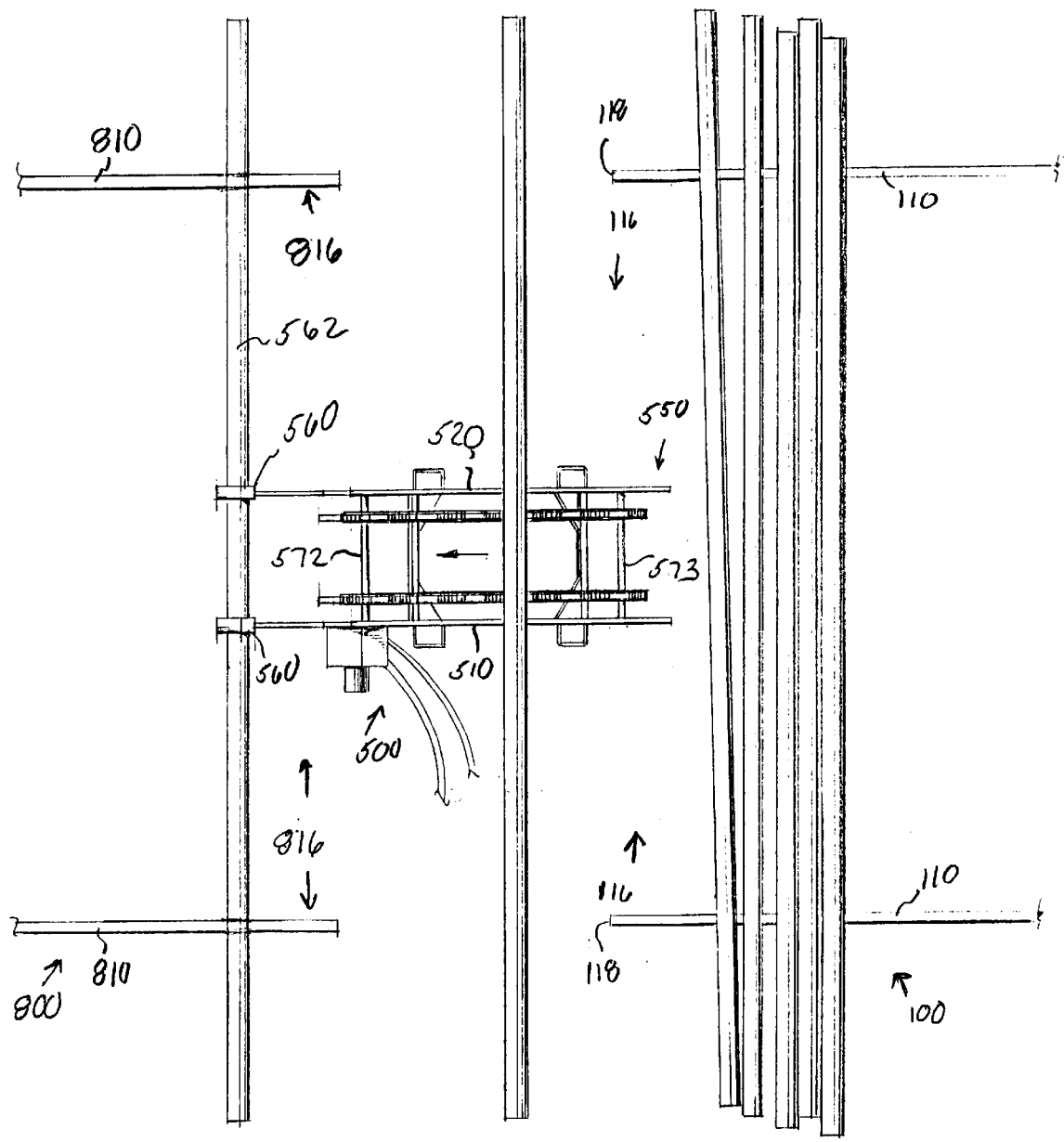
FIG. 4 is a top view of the system and showing lower and upper storage racks.

Turning more particularly to the drawings, FIG. 4 shows a top view of the system as comprising a first downstream storage rack 100, an upstream storage rack 800 and an intermediate lifter device 500. The first storage rack 100 includes a pair of spaced-apart 110 rails which extend along the desired course of pipe travel. The rails 110 are preferably supported at an above ground position by a plurality of a vertical support posts 112 (FIG. 2) or the like. The rails 110 preferably present a planar top surface 114 so as to allow for rolling movement of the pipes 2000 therealong. As such the rack 100 includes an output zone 116 of the system as defined by the area/zone traversing the free ends 118 of the rails 110.

Likewise a second storage rack 800 is longitudinally displaced from the second rack 100 and includes a pair of longitudinally spaced-apart rails 810 as supported by support posts 812 (FIG. 3) in an above ground position higher than the elevation of the first storage rack 100. Alternatively, this second storage location may be the back end of a pick up truck or the like. The top surfaces 818 of rails 810 allow for rolling movement of the pipes 2000 therealong. As such the rack includes an input zone 816 as defined by the zone traversing the free ends 820 of the rails 810.

Intermediate the first and second racks 100, 800 is the pipe lifter component 500 of the system. The lifter device 500 includes first and second laterally spaced-apart beams 510, 520 having a first lower/input end 550 and a second upper/output or discharge end 560. Beams 510, 520 are reinforced by laterally extending struts 590.

The lower free end 512, 522 of each beam 510, 520 is preferably placed at a ground support position interiorly displaced relative to the free ends 118 of the rails 110 of the first/lower rack 100. The opposed upper ends 514, 524 of the beams 510, 512 include connector clamps 561 which are a attached to a bar 562. Clamps 561 further function to space the beam ends 514, 524 therefrom. Bar 562 in turn can be further connected to the second storage rack 800 or to an end of a truck bed or the like by straps 563.

Extending between the laterally spaced-apart beams 510, 520 is a chain drive assembly 550 which includes a pair of drive wheels 570 mounted to a driven axle 572 extending through the upper ends 514, 524 of the beams 510, 520. Axle 572 is driven by a motor assembly 574 which can be energized by various fluid power sources such as hydraulic, pneumatic via fluid hoses 576, 578 or electric power. At the lower end 550 of the beams 510, 520 are idler wheels 571 which are mounted about rotatable axle 573 extending through the lower end 512, 522 of beams 510, 520.

A pair of spaced-apart drive chains 580 is wound about the respective drive 570 and idler 576 wheels. Along each chain 580 are a plurality of paired, outwardly extending finger-like flanges 592 which offer first and second laterally spaced points of underlying support to a pipe 2000 placed thereacross.

Upon energizing the motor 574, the chains 580 and fingers 592 thereon are driven in a counterclockwise direction as viewed in FIG. 2. The position of the lower beam ends 512, 552 relative to the output end 116 of the first storage rack 100 is such that the fingers 592 are driven through the input zone 116 of the first rack 100. Thus, upon passing the rails 110 the fingers 592 pick up a pipe positioned in the input zone 116 as shown in FIG. 2. This pipe is then transported towards the upper elevated end 560 of the lifter assembly 500, the spaced-apart fingers 592 offering stability during pipe 2000 travel. Upon movement of the support fingers 592 over the top 560 of the lifter device and toward the lower end 550 the pipe 2000 is then deposited at the input zone 816 of the second storage rack 800 or the bed of a truck or the like. The displacement of the upper beam ends 514, 524 from the bar 562 by connectors 561 allows for return of the fingers 592 towards the lower beam ends.

It is understood that each pipe 2000 can be positioned at the input zone 116 either by the rails 110 being inclined or by manipulation thereto by a worker standing on one side of the rail. Thus, as long as a pipe 2000 is in the pick up zone 116, the paired fingers 192 will pick up such pipe 2000 for elevation towards the upper end 562 and second storage location. Alternatively, the rack 100 can be used as leverage so that one worker can manipulate the pipe 2000 onto the fingers 592.

As above described the use of the above system enables one worker to position a pipe 2000 in the pick up zone 116 for engagement with fingers 192. Accordingly, such pipes are efficiently transported from one site to the other.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A pipe lifting system comprising:
    a first storage rack including first and second spaced-apart above ground rails adapted for supporting a plurality of elongated pipes traversing a desired path of upstream travel, said rails defining a plane displaced from the ground;
    a second storage location upstream said first storage rack adapted for supporting a plurality of elongated pipes, said second storage location traversing said path of travel;
    means for elevating at least one of the pipes from said first rack to said second storage location, said elevating means positioned intermediate said first rack and second storage location, said elevating means having a first ground adjacent lower end positioned below said first and second rails of said storage rack and a second upper end positioned adjacent an end of said second storage location, said elevating means including means for pick up of at least one of the pipes positioned on said first rack upon a driven movement of said pick up means between said lower end and upper end of said elevating means and through said plane for deposit of the one pipe at said second storage location upon said driven movement of said pick up means from said upper end and towards said lower end;
    means for releasably connecting said upper end of said elevating means to said position adjacent said second storage location end, said means including:
        a bar traversing said end of said second storage location;
        bracket means having first and second ends, said first end extending from said upper end of said elevating means and a second free end presenting structure for a releasable attachment about said traversing bar.

2. The system as claimed in claim 1 wherein said elevating means comprises:
    a pair of parallel beams, said beams including said upper and ground adjacent lower ends;
    a continuous chain assembly positioned between said beam upper and lower ends;
    means for driving said chain assembly in continuous movement between said lower and upper ends, said means providing said driven movement;
    at least one flange extending from said chain assembly for providing said pick up means, said at least one flange offering underlying support to the one pipe upon passage of said at least one flange between said lower and upper beam ends and through said plane, whereby to elevate the one pipe from said first storage rack to said upper beam end.

3. The system as claimed in claim 2 wherein said chain assembly includes:
    a pair of parallel chains extending between said upper and lower beam ends;
    said at least one flange comprising a plurality of paired fingers with each finger of said finger pair extending from one of said chains, said finger pair supporting the one pipe at two discrete points of contact therealong.

4. The system as claimed in claim 2 wherein said beam lower ends are positioned between said first and second rails.

5. The system as claimed in claim 1 wherein said second storage location comprises a bed of a truck, said bar traversing an end of the truck bed.

6. The system as claimed in claim 1 wherein said free end of said bracket means comprises a clamp positioned about said traversing bar.

7. A pipe lifting system comprising:
    a first storage location adapted for supporting a plurality of elongated pipes at an above ground position traversing a desired path of upstream travel;
    a second storage location upstream said first storage location adapted for supporting a plurality of the elongated pipes therein;
    a bar traversing said second storage location adjacent an end thereof;
    means for elevating at least one of the pipes from said first location to said second location, said elevating means positioned intermediate said first and second locations, said elevating means having a first lower end positioned below said first storage location and upwardly extending therefrom to present a second upper end releasably attached to said traversing bar and above said second storage location, said elevating means including means for a pick up of one of the pipes in said first storage location upon movement of said pick up means from said lower end and towards said upper end, a deposit of the pipe at said second storage location occurring upon a further movement of said pick up means from said upper end and towards said lower end.

8. The system as claimed in claim 7 wherein said elevating means comprises:
    a pair of spaced-apart beams, said beams including said upper and lower ends, said lower ends positioned below the pipes at said above ground position;
    a continuous chain assembly extending between said beam upper and lower ends;

means for driving said chain assembly in movement between said lower and upper ends;

at least one flange extending from said chain for providing said pick up means, said at least one flange underlyingly contacting the one pipe in said first storage location upon movement of said at least one flange from said lower beam ends to said upper beam ends whereby to displace said pipe from said first storage location in movement toward said upper beam ends.

9. The system as claimed in claim 8 wherein said chain assembly comprises:

a pair of parallel chains extending between said upper and lower beam ends;

said at least one flange comprising a plurality of paired fingers with each finger of said finger pair extending from one of said chains, said finger pair underlyingly supporting said one pipe at multiple points of contact therealong.

10. The system as claimed in claim 7 wherein said first storage rack comprises:

a pair of spaced-apart first and second rails, the one pipe resting atop said rails, said lower end of said elevating means positioned between said rails, said rails defining a plane with said pick up means passing through said plane.

11. The system as claimed in claim 7 wherein said second storage location comprises a bed of a truck, said bar traversing an end of the truck bed.

12. A pipe lifting system comprising:

a first storage location adapted for supporting a plurality of elongated pipes in an above ground position traversing a desired path of upstream path travel;

a second storage location upstream said first storage location for the pipes in said first location;

a bar traversing said second location at an input end thereof, means for sequentially elevating each one of said pipes from said first location to said second location, said elevating means including at least one beam having a first lower end positioned adjacent an end of said first storage location and a second upper end positioned at least adjacent said second storage location, said elevating means including a plurality of spaced-apart support flanges in continuous movement between said lower and upper ends of said at least one beam for underlying support of said pipes at said first location upon placement of one of the pipes on one of said flanges, the one pipe released from said flange support for deposit at said second location upon movement of said supporting flange from the upper end of said at least one beam and towards said lower end thereof; and a bracket extending between an upper end of said at least one beam and said bar, said bracket releasably associating said upper beam end with said second location.

13. The system as claimed in claim 12 wherein said at least one beam of said elevating means comprises:

a pair of beams extending along a route of pipe travel between said first and second locations, said beams including said upper and lower ends;

a chain assembly positioned between said beam pair upper and lower ends;

means for driving said chain in movement between said lower and upper ends, said flanges extending from said chain assembly.

14. The system as claimed in claim 13 wherein said chain assembly comprises a pair of spaced-apart chains, said flanges comprising a plurality of spaced-apart fingers with each finger respectively extending from one of said chains, a finger pair supporting a pipe thereon upon movement of said flange pair between said lower and upper ends.

15. The system as claimed in claim 12 wherein said second storage location comprises a truck bed, said bar traversing the truck bed.

\* \* \* \* \*